March 17, 1942.　　F. P. SCULLY ET AL　　2,276,798
AUDIBLE SIGNALING MEANS FOR TANKS
Filed Dec. 23, 1939
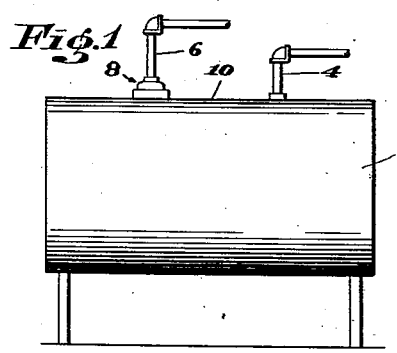
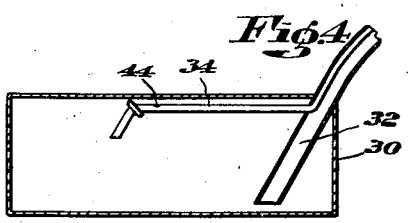
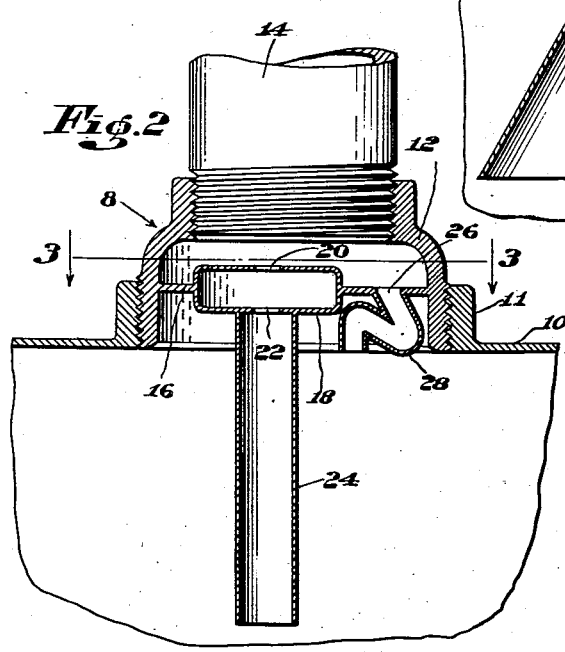
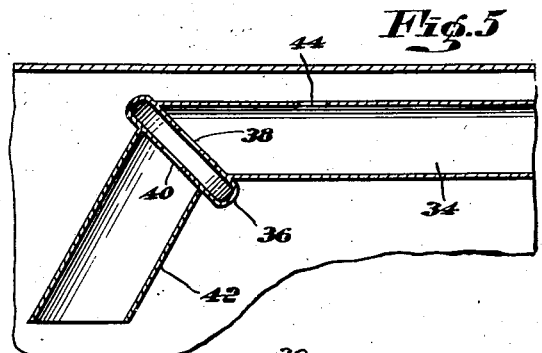
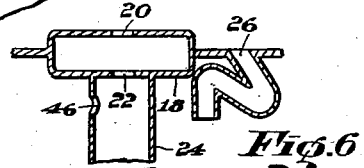
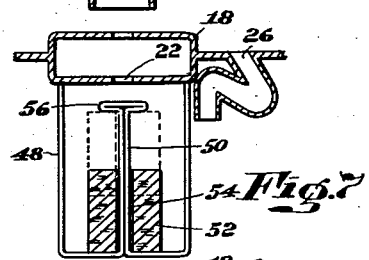
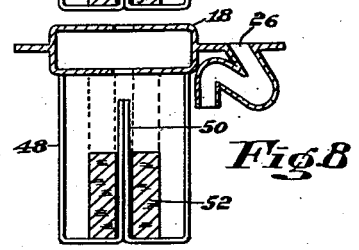
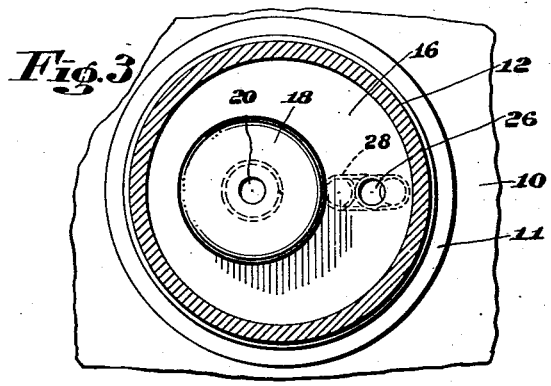
INVENTORS
FRANK P. SCULLY
ALCIDE E. MATHEY
BY Yardley Chittick
ATTORNEY Patented Mar. 17, 1942

2,276,798

UNITED STATES PATENT OFFICE 2,276,798

AUDIBLE SIGNALING MEANS FOR TANKS

Frank P. Scully, Cambridge, and Alcide E. Mathey, Auburndale, Mass., assignors to Scully Signal Co., East Cambridge, Mass., a corporation of Massachusetts Application December 23, 1939, Serial No. 310,696

15 Claims. (Cl. 137—111)

This invention relates to means for use in connection with tanks to indicate when the liquid level has risen to a predetermined point therein.

In filling tanks it is usually desirable to fill them to a point near the top at each time of filling so that the number of fillings may be minimized. If this is to be accomplished without overflow, it is necessary that a positive signal be provided to indicate to the operator when the liquid level has reached the desired predetermined point.

Furthermore, it is also necessary to provide adequate venting means during the filling operation so that undue pressures will not be created and liquid will not be forced out through the fill pipe.

One of the objects of this invention is to provide a simple signaling mechanism which is reliable in operation, cheap to manufacture, and so constructed that a permanently open vent will be available both before and after the signal has been given.

Another object of the invention is to provide a signaling mechanism which may be used with equal success in different types of tanks, whether they be fuel oil tanks or automobile gasoline tanks, or any other type of tank in which it is desired to indicate the level of the liquid therein.

A further object of our invention is to provide a venting and signaling mechanism in which there will be a permanently open vent and another vent adapted to give a signal when the tank has been filled to the desired point and so constructed that the vent containing the signaling device may or may not be shut off from further venting at that time. It is our intention to provide a device which will give an adequate signal when the liquid level has risen to the desired point, but the change may be accomplished either by shutting off the flow of gas through the signaling device altogether or by changing the nature of the flow of gas therethrough. In either case the indication will be given to the operator.

It is further intended that the signal may be brought into operation either by the trapping of the lower end of a tube extending downwardly into the tank through which gases may pass to the whistle or through the use of a buoyant member which will rise with the liquid to change the signal when the level has risen to a predetermined point.

In either case, the permanently open port will always be available to take care of venting of additional gas after the signal has been given without the development of excessive pressures, so that safety of operation is at all times assured.

These and other objects of the invention will become more apparent as the description proceeds with the aid of the accompanying drawing, in which Fig. 1 is a diagrammatic view of a tank having filling and venting connections;

Fig. 2 is a cross-sectional elevation of a preferred form of signaling means;

Fig. 3 is a section on the line 3—3 of Fig. 2;

Fig. 4 is a diagrammatic showing of another type of tank utilizing a modified form of signaling mechanism;

Fig. 5 is a sectional detail of the signaling mechanism shown in Fig. 4;

Fig. 6 is a sectional elevation of the signaling mechanism showing a modified form in which the gases passing through the signaling device are not shut off but modified in direction;

Fig. 7 is a sectional elevation of a further modification of the signaling device in which the gases through the whistle are modified in direction but not shut off;

Fig. 8 is a sectional elevation of another modification of the signaling device in which the gas through the whistle is shut off to give the signal.

Referring to the drawing, in Fig. 1 is shown a tank 2 having a filling connection 4 and a venting connection 6. The ends of these connections may extend to any convenient points for the introduction of liquid and the venting of gas from the tank.

Indicated at 8 in Figs. 1 and 2 is the signaling and venting mechanism shown in detail in Fig. 2. The tank top 10 at the venting connection has an upwardly turned flange 11 internally threaded to receive the housing 12 of the signaling device, which housing is exteriorly threaded at its lower end to engage the threads of flange 11 and interiorly threaded at its upper end to receive vent pipe 14 of the venting connection 6.

Housing 12 is closed in part by a horizontally extending web 16, which web, however, has two openings therethrough. In one of these openings is positioned a whistle 18 in the form of the well-known button type, which whistle has upper and lower apertures 20 and 22. Extending downwardly from whistle 18 is an intrusion tube 24. The length of this tube is determined by the elevation to which it is desired the liquid shall rise before the signal is given. It will be noted that all gas that passes through whistle 18 must pass through intrusion tube 24.

The second opening through web 16 is at 26 and extending downwardly from this opening is a Z-shaped tube 28 which provides a secondary passage through which gas may also escape from the tank.

The object of this construction is to provide dual passages, one of which may contain a whistle to give the desired signal, while the other is a permanently open passage to insure subsequent venting of gas from the tank after the lower end of intrusion tube 24 has been trapped by rising liquid. The object of the Z-shaped tube 28 in connection with the secondary opening 26 is to increase the resistance of gas in passing through opening 26. Any other suitable arrangement that would increase the resistance of gas escaping through the secondary port 26 could be used or the opening 26 might be reduced in area to accomplish the same result. However, a larger opening is preferred utilizing a tortuous passage as shown or equivalent baffling means for increasing the resistance of gases passing therethrough.

The size of the apertures 20 and 22 through whistle 18 is adjusted to the size of opening 26 so that during normal filling of the tank a sufficient amount of gas will pass through the whistle to produce an audible sound; but at the same time the relationship must be such that after the lower end of intrusion tube 24 has been trapped, the opening 26 may provide for escape of gases thereafter until such time as the supply can be shut off.

In the operation of the constructions shown in Figs. 2 and 3 the following takes place. Liquid is supplied through filling connection 4 and the gas at once begins to escape through venting connection 6. Part of the gas passes through whistle 18 and part through opening 26, the gases joining at a point above the whistle to pass out through vent pipe 14. Because of the relationship of the two ports 18 and 26, if filling takes place at a normal or greater rate, then an adequate amount of gas will pass through whistle 18 to cause an audible signal. This signal continues as long as the level is below intrusion tube 24, but as soon as the lower end of tube 24 is sealed by the rising level, then no more gas can pass through whistle 18 and whistling immediately ceases, indicating to the operator that the tank is filled to the desired point. Until the supply is cut off, the remaining gas trapped at the top of the tank can escape through opening 26.

It is appreciated that if the rate of fill is very low, the amount of gas passing through whistle 18 would probably be inadequate to give the desired signal, but it is to be understood that the two ports are arranged for conditions that normally prevail. On the other hand, if filling should be in excess of the usual rate, the signal would function the same as normally.

A modified construction, but working on exactly the same principle, is shown in Figs. 4 and 5, in which a gasoline tank or the like is diagrammatically represented at 30, having extending downwardly therein a fill pipe 32 providing a so-called deep fill and a venting pipe 34. For convenience the vent pipe extends to the atmosphere through the upper portion of fill pipe 32. However, this is not necessary as the vent pipe could be led to the atmosphere through the tank at any convenient port.

The details of the signaling device of Fig. 4 are shown in Fig. 5, in which the vent pipe 34 has connected thereto at its inner end a whistle 36 set for convenience at an angle of approximately 45 degrees; but the particular angle is immaterial. Whistle 36 is of the usual button type, having aligned apertures 38 and 40 therethrough. This form of whistle, the same as whistle 18 previously referred to, is designed to give an audible signal at low pressures and is therefore suitable for use in this connection. Attached to the inner side of whistle 36 and extending downwardly into tank 30 a suitable distance is an intrusion tube 42. The length of this tube determines the point at which the level of the liquid is indicated to the operator.

A secondary port to admit escaping gases to vent pipe 34 is shown at 44 in Figs. 4 and 5. This secondary port is in effect the same as port 26 shown in Figs. 1 to 3, and provides the always open by-pass about the whistle operative after the rising liquid level has trapped the lower end of intrusion tube 42. Thus, gases passing through whistle 36 and secondary port 44 join to escape to the atmosphere through vent pipe 34.

In the operation of the construction shown in Figs. 4 and 5 liquid is fed into the tank through fill pipe 32 and gas immediately begins to escape to the atmosphere through vent pipe 34. Part of the gas passes through whistle 36 and part through secondary port 44; but the relationship of the size of the apertures 38 and 40 in the whistle and secondary port 44 is such that at normal filling rates or greater an adequate volume of gas will pass through the whistle to provide audibility. After the liquid level has risen to trap the lower end of intrusion tube 42, no further gas passes through the whistle, which immediately becomes silent, indicating to the operator that the tank has been filled to the desired level. Until the liquid supply is cut off gas may thereafter escape through secondary port 44.

A further modification of our invention is shown in Fig. 6, which differs from Fig. 2 only in the inclusion of a hole 46 near the upper end of the intrusion tube 24 and a short distance below the whistle 18.

The purpose of this construction is to permit further venting of gas through both the opening 26 and the whistle 18 after the liquid level has risen to the lower end of intrusion tube 24, but at the same time causing cessation of the whistle. This is brought about due to the fact that gas passing into tube 24 through the hole or opening 46 enters at such an angle that the gas thereafter passing through openings 20 and 22 of the whistle is so distorted that the resonance of the whistle is destroyed.

In Figs. 7 and 8 we show further modifications in which the change in the signal is brought about through the use of a buoyant device which rises with the liquid level to cause a change in the signal at the appropriate point.

In Fig. 7 there depends from whistle 18 a U-shaped frame 48 having extending upwardly from the bottom thereof a guide rod 50. On this guide rod is positioned a float 52 which may be, for example, a cork having a longitudinally extending hole 54 therethrough. On the upper end of guide rod 50 is a cross bar 56 which acts as a stop to limit the upward movement of float 52. The location of cross bar 56 with respect to the lower whistle aperture 22 is such that when float 52 has been moved upwardly under the influence of a rising liquid level to a position where it is in engagement with stop 56, the gas that may pass into the whistle must do so at such an angle that the resonance of the whistle is destroyed. In this way the signal is given when the liquid level is at the desired point.

In Fig. 8 we have shown a construction similar to that of Fig. 7 except that the guide rod 50 has no stop on its upper end. This permits the float 52 to continue its upward movement until it is in engagement with the bottom of the whistle, thereby shutting off flow of gas through the whistle to render it inaudible.

In the constructions shown in Figs. 7 and 8 it is obvious that any suitable guiding mechanism for the floats may be used, and likewise, the buoyant means may be arranged in any convenient manner that will accomplish the desired result of either changing the flow of gas to the whistle or cutting it off altogther.

Thus from the illustrative examples shown it can be seen that we have provided signaling mechanisms coupled with a permanently open auxiliary port. The auxiliary port in every case, however, is adjusted in size in relation to the effective area of the ports through the signaling device so that during filling at a normal rate an adequate amount of gas will pass through the signaling device to give the intended signal. At the same time after the liquid level has risen to the point at which the indication is desired, the auxiliary port will provide an adequate opening to the atmosphere for further venting to prevent the development of any excessive tank pressures. This condition will be so whether gas is entirely prevented from passing through the signaling device after the liquid level has risen to the predetermined point, as in Figs. 2, 5 and 8, or whether the gas to the signaling device is merely distorted, as in Figs. 6 and 7. In either case it will be seen that there is a change in the signal at the proper time so that the operator may be advised to shut off the liquid supply.

We claim:

1. A tank having filling and venting means, said venting means having two always open ports leading thereto through which gas escaping from said tank may pass, one of said ports including a fixed whistle, the resistance to flow of gas offered by the other port being such that during filling an adequate volume of gas will pass through said whistle to produce audibility, a tube connected to said whistle and extending downwardly into said tank to alter the flow of gas through said whistle when the liquid level reaches said tube, the entrance to said other port being above the entrance to said tube.

2. A venting connection for use with a tank, comprising a tubular housing, a baffle extending transversely of said tubular member, said baffle having two ports therethrough, one port including a whistle and the other port being open at all times, said other port being in the form of a tortuous passage, and a tube in series with said whistle extending downwardly therefrom.

3. Venting means for use with tanks comprising two venting passages, the first passage having a whistle in series therewith and means for altering the flow of gas through said whistle when the liquid level rises to a predetermined point, the second passage being permanently open for venting and having its entrance located above the point at which the rising liquid level alters the flow of gas through said first passage, the combined resistances of said passages to flow of gas therethrough being such as to create a pressure in said tank sufficient to cause an adequate volume of gas to pass through said whistle during filling to give a signal indication.

4. Venting means for use with tanks as set forth in claim 3, including a conduit to which said first and second passages are connected whereby gases flowing from said passages may merge therein.

5. A tank having filling and venting means, said filling means comprising a fill pipe, said venting means comprising two venting passages, the first passage having a whistle in series therewith and means for altering the flow of gas through said whistle when the liquid level rises to a predetermined point, the second passage being permanently open for venting and having its entrance located above the point at which the rising liquid level alters the flow of gas through said first passage, the combined resistances of said passages to flow of gas therethrough being such as to create a pressure in said tank sufficient to cause an adequate volume of gas to pass through said whistle during filling to give a signal indication, a conduit to which said first and second passages are connected whereby gas flowing from said passages may merge therein, said conduit extending into said fill pipe.

6. A venting connection for use with a tank comprising a pipe extending from the interior of said tank to the atmosphere, a whistle attached to the inner end of said pipe, said pipe having an always open port therethrough in that part of said pipe that is within said tank, said always open port commencing at a point above the entrance to said whistle, the resistance to flow of gas offered by said always open port being such that during filling an adequate volume of gas will pass through said whistle to produce audibility.

7. Venting means for use with tanks, comprising two always open ports through which gas escaping from a tank with which said venting means may be used may pass, one of said ports including a fixed whistle, the resistance to flow of gas offered by the other port being such that during filling an adequate volume of gas will pass through said whistle to produce audibility, and a tube connected to said whistle and extending downwardly into said tank to alter the flow of gas through said whistle when the liquid level reaches said tube, the entrance to said other port being above the entrance to said tube.

8. A unit for use with a liquid containing tank, which tank includes filling means, said unit having two passages therethrough, a gas-operated signaling device in series with one of said passages, the other of said passages being always open whereby during filling part of the escaping gas will pass through said signaling device and part through said other passage, the resistance to flow of gas offered by said other passage being such that during filling an adequate volume of gas will pass through said signaling device to give a signal indication, means for varying the flow of gas through said signaling device to produce a change in the signal when the liquid level in said tank has risen to a predetermined point with respect to said unit, the entrance to said other passage being above said predetermined point.

9. A unit for use with a liquid containing tank, which tank includes filling means, said unit having two passages therethrough, a whistle in series with one of said passages, the other of said passages being always open whereby during filling part of the escaping gas will pass through said whistle and part through said other passage, the resistance to flow of gas offered by said other passage being such that during filling an adequate volume of gas will pass through said whistle to produce audibility, means for varying the flow of gas through said whistle when the liquid level in said tank has risen to a predetermined point with respect to said unit whereby said audibility may be varied, the entrance to said other passage being above said predetermined point.

10. A unit for use with a liquid containing tank, which tank includes filling means, said unit having two passages therethrough, a gas-operated signaling device in series with one of said passages, a tube connected to said passage and extending downwardly therefrom, the other of said passages being always open whereby during filling part of the escaping gas will pass through said signaling device and part through said other passage, the resistance to flow of gas offered by said other passage being such that during filling an adequate volume of gas will pass through said signaling device to produce audibility, said tube providing means for cutting off the flow of gas through said signaling device when the liquid level in said tank has risen to a predetermined point with respect to said unit whereby audibility will cease, the entrance to said other passage being above the entrance to said tube.

11. A unit for use with a liquid containing tank, which tank includes filling means, said unit having two passages therethrough, a gas-operated signaling device in series with one of said passages, a tube connected to said passage and extending downwardly therefrom, a port in the side of said tube between its lower end and said signaling device, the other of said passages being always open whereby during filling part of the escaping gas will pass through said signaling device and part through said other passage, the resistance to flow of gas offered by said other passage being such that during filling an adequate volume of gas will pass through said signaling device to produce audibility, said tube and port therein providing means for varying the flow of gas through said signaling device when the liquid level in said tank has risen to a predetermined point with respect to said unit whereby audibility of said signaling device will cease.

12. A venting connection for use with a tank comprising a pipe extending from the interior of said tank to the atmosphere, a whistle attached to the inner end of said pipe, a tube attached to the opposite side of said whistle and extending downwardly therefrom, said pipe having an always open by-pass about said whistle and in that part of said pipe that is within said tank, the resistance to flow of gas offered by said by-pass being such that during filling an adequate volume of gas will pass through said whistle to give a signal indication.

13. A unit for use with a liquid containing tank, which tank includes filling means, said unit having two passages therethrough, a gas-operated signaling device in series with one of said passages, the other of said passages being always open whereby during filling part of the escaping gas will pass through said signaling device and part through said other passage, the resistance to flow of gas offered by said other passage being such that during filling an adequate volume of gas will pass through said signaling device to produce audibility, and buoyant means for varying the flow of gas through said signaling device when the liquid level has risen to a predetermined point with respect to said unit whereby audibility will cease.

14. A unit for use with a liquid containing tank, which tank includes filling means, said unit having two passages therethrough, a gas-operated signaling device in series with one of said passages, the other of said passages being always open whereby during filling part of the escaping gas will pass through said signaling device and part through said other passage, the resistance to flow of gas offered by said other passage being such that during filling an adequate volume of gas will pass through said signaling device to produce audibility, and buoyant means for cutting off the flow of gas through said signaling device when the liquid level has risen to a predetermined point with respect to said unit whereby audibility will cease.

15. Venting means for use with tanks comprising a unit having two passages therethrough through which gas escaping from a tank with which said venting means may be used may pass, one of said passages including a fixed whistle and tube in series, the other of said passages being permanently open, the resistance to flow of gas offered by the other of said passages being such that during filling an adequate volume of gas will pass through said whistle to produce audibility, the passage formed by said whistle and tube in series extending downwardly into said tank to alter the flow of gas through said whistle when the liquid level traps said first passage, the entrance to said other passage being above the entrance to said whistle passage.

FRANK P. SCULLY.
ALCIDE E. MATHEY.